United States Patent Office 3,466,197
Patented Sept. 9, 1969

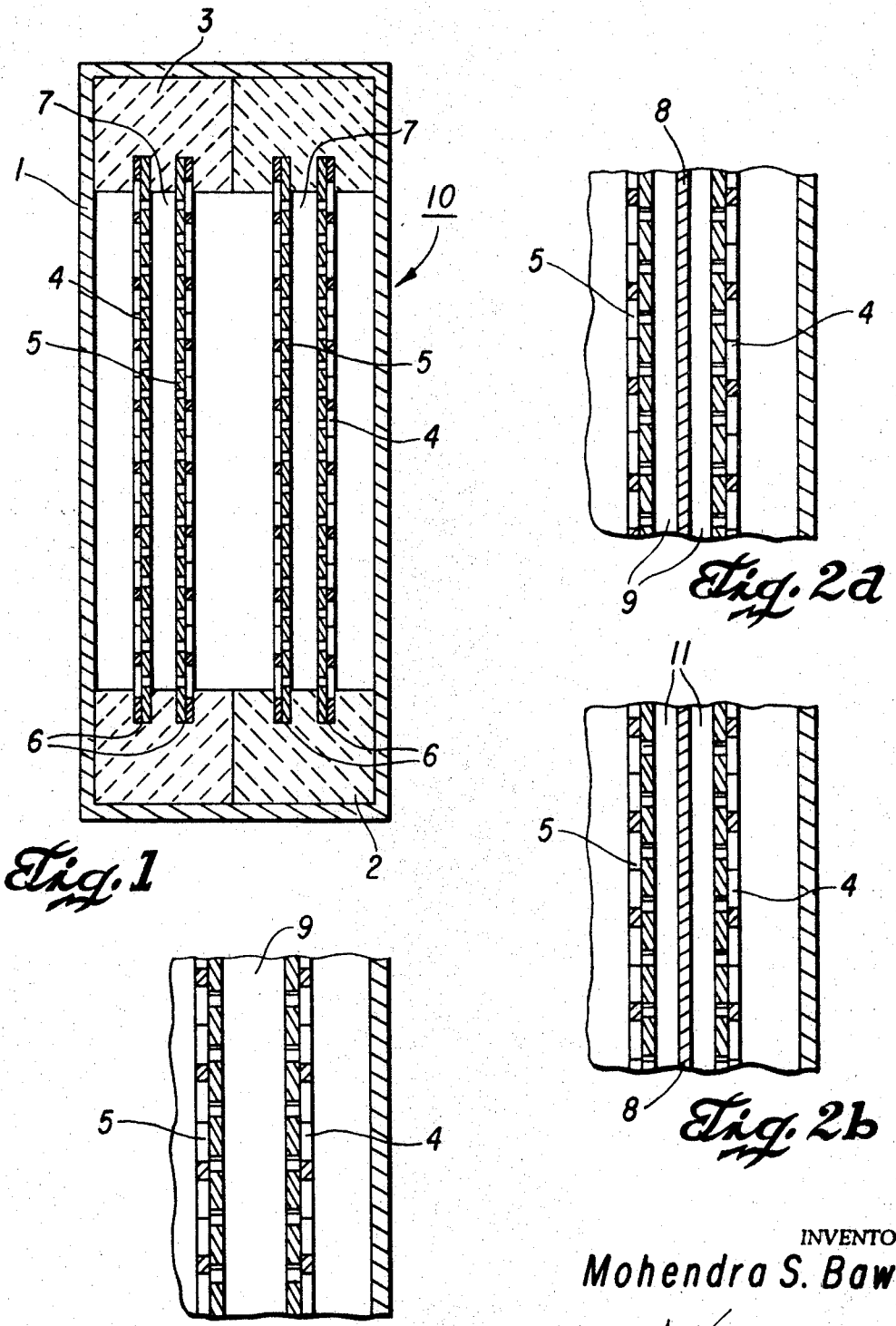

3,466,197
METHOD OF MAKING CARBONATE ELECTROLYTE MATRIX AND FUEL CELL THEREWITH
Mohendra S. Bawa, Dallas, Tex., assignor to Texas Instruments Incorporated, Dallas, Tex., a corporation of Delaware
Filed Dec. 14, 1966, Ser. No. 601,782
Int. Cl. H01m 27/16, 27/20
U.S. Cl. 136—86                    6 Claims

ABSTRACT OF THE DISCLOSURE

Disclosed is an electrolyte-matrix for use in thin molten carbonate fuel cells and a method for making same, the electrolyte-matrix being disposed between the anode and the cathode of the fuel cell and containing a membrane with which the molten carbonate of the electrolyte reacts to form a porous support medium to hold and contain the electrolyte during operation of the fuel cell; the method comprises the steps of mixing particular oxide and carbonate compounds, heating the mixture, grinding the mixture to form a powder, and mixing particular metals with the powder to form the electrolyte-matrix material.

---

This invention relates to fuel cells and more particularly to an electrolyte-matrix and the process of making the same for use in molten carbonate fuel cells. The invention further involves a molten carbonate fuel cell utilizing such an electrolyte-matrix.

As is well known, a molten carbonate fuel cell generally comprises a cathode, an anode, and an electrolyte-matrix comprising a sodium lithium carbonate electrolyte held in a support medium, the matrix making mutual contact to both the anode and cathode. When a fuel containing hydrogen or capable of generating the same directly or indirectly, is applied to and reacts on the anode side of the electrolyte, and an oxidant containing essentially oxygen and carbon dioxide is applied to and reacts on the cathode side of the electrolyte, a flow of current is produced in an external circuit connected to the anode and cathode.

The present trend in fuel cell development is toward lighter, smaller and thinner fuel cells. Inherent in the reduction of the spacing between the anode and cathode of a fuel cell is the problem of maintaining a gas-tight electrolyte-matrix seal. In the larger cells where the electrode spacing is in the range of 75 milli-inches, nonuniformities and discontinuities of the electrolyte-matrix at the surface of the electrodes are compensated for by the relatively large thickness of the electrolyte-matrix. However, as this electrode spacing is decreased to the range of 5 to 10 milli-inches, there is not enough thickness of electrolyte to compensate for any nonuniformity of the electrolyte-matrix.

With this problem in mind, an object of this invention to provide an electrolyte-matrix material with high ionic conductivity and good sealing properties for use in very thin molten carbonate fuel cells.

It is another object of the invention to provide a method for forming a very thin and uniform electrolyte-matrix for molten carbonate fuel cells.

The novel features believed to be characteristic of the invention are set forth with particularity in the appended claims. The invention itself, however, as well as further objects and advantages thereof, may best be understood by reference to the following detailed description of illustrative embodiments, when read in conjunction with the accompanying drawing, wherein:

FIGURE 1 is a sectional view of a portion of a typical fuel cell;

FIGURE 2a is a sectional view of a portion of the fuel cell shown in FIGURE 1 having an electrolyte-matrix composed of a mica or fiber glass sheet and the electrolyte-matrix material of the invention;

FIGURE 2b is a sectional view of a portion of the fuel cell shown in FIGURE 1 having an electrolyte-matrix composed of a mica or fiber glass sheet and sodium lithium carbonate as the electrolyte;

FIGURE 2c is a sectional view of a portion of the fuel cell shown in FIGURE 1 having an electrolyte-matrix composed of only the electrolyte-matrix material of the invention.

In brief, whereas in a conventional molten carbonate fuel cell the electrolyte-matrix (electrolyte and support medium) is composed of sodium lithium carbonate ($NaLiCO_3$) as the electrolyte and such nonreactive materials as magnesium oxide (MgO) and aluminum oxide ($Al_2O_3$) as the support medium, the preferred embodiments of this invention involve electrolyte-matrices each composed of a sheet of mica or fiber glass with either one of the electrolyte-matrix materials of the invention disposed on each or only one side of a mica or fiber glass sheet. The mica or fiber glass sheet (membrane) forms a very tight electrolyte-to-electrode seal, thus decreasing the likelihood of gas leakage in very thin fuel cells. The membrane thereby enables the use of an electrolyte-matrix of less thickness than could otherwise be used.

The electrolyte-matrix material at the operating temperature of the fuel cell (about 700° C.) is, according to the invention, a mixture of sodium lithium carbonate ($NaLiCO_3$), sodium lithium aluminate ($NaLiAl_2O_4$), sodium lithium silicate ($NaLiSiO_3$), aluminum oxide ($Al_2O_3$), magnesium oxide (MgO), chromium oxide ($Cr_2O_3$) and zinc oxide (ZnO), which at the fuel cell operating temperature, reacts with the mica or fiber glass sheet to form a very uniform and highly ionic conductive electrolyte-matrix.

Mica is a common mineral found in a natural state with a variable composition containing such components as silicon oxide ($SiO_2$), magnesium oxide (MgO), potassium oxide ($K_2O$), aluminum oxide ($Al_2O_3$) and iron oxide ($Fe_2O_3$). The molten carbonate reacts with the iron, silicon and potassium oxides in the sheet and thereby allows ion conductivity through the sheet but leaves the unreacted aluminum oxide and magnesium oxide in the original mica sheet to furnish additional support for the electrolyte.

Fiber glass, a commercially produced material, reacts similarly to mica in fuel cell operation. Fiber glass is composed of silicate glass fibers bonded together with an organic binder. Such flux compounds as potassium and sodium oxides are added to the silicon oxide constituent of the glass to lower the melting temperature of the glass. The molten carbonate reacts with the flux compounds of the glass to form a porous support medium as described previously in connection with the mica sheet.

The electrolyte-matrix material of the invention is prepared by mixing powdered sodium lithium carbonate, aluminum oxide, magnesium oxide, and silicon oxide ($SiO_2$) in a dry state, heating the mixture in an air atmosphere for about four hours at about 800° C., and regrinding the resulting sintered material back to a powder. The sintering operation causes the starting materials to partially react, thereby resulting in a mixture of unreacted sodium lithium carbonate, aluminum oxide and magnesium oxide with the reaction products, lithium aluminate, lithium silicate, sodium aluminate and sodium silicate. A portion of this sintered material is mixed with sodium silicate and powdered aluminum zinc, and chromium oxide. Enough water is added to make a thin slurry for ease of application to the fuel cell electrodes. The powdered aluminum and zinc enhance the bond between the ceramic materials (aluminum oxide and magnesium oxide) present in the sintered material, thus making the electrolyte-matrix more rigid and contributing to the dimensional stability of the very thin cells. Chromium oxide adds bulk to the electrolyte-matrix material and sodium silicate contributes to the bond between the electrolyte-matrix and the electrodes. Two possible combinations of the above-mentioned materials are given as specific examples of the embodiments of the invention for illustrative purposes only and not by way of limitation.

EXAMPLE 1

An electrolyte-matrix material is prepared according to the invention as follows: 53 parts of powdered sodium lithium carbonate, 15 parts of powdered aluminum oxide, 6 parts of powdered magnesium oxide, and 26 parts of powdered silicon oxide are thoroughly mixed dry and heated at about 800° C. for about four hours in an air atmosphere. After the sintered mixture is allowed to cool, the mixture is reground to a powder. To 41 parts of this mixture are added 24 parts of powdered aluminum, 2 parts of powdered zinc, 20 parts of powdered chromium oxide, and 13 parts of sodium silicate. Sufficient water is added to form a thin slurry. The slurry is brushed or placed on both or one of the electrodes so as to give a dried thickness of about 5 milli-inches following the evaporation of the water.

EXAMPLE 2

Another embodiment of the electrolyte-matrix material is prepared according to the invention as follows: 60 parts of powdered sodium lithium carbonate, 12 parts of powdered aluminum oxide, 5 parts of magnesium oxide, and 23 parts of powdered silicon oxide are thoroughly mixed dry and heated at about 800° C. for about four hours in an air atmosphere. After the sintered mixture is allowed to cool, the mixture is reground to a powder. To 41 parts of the mixture are added 24 parts of powdered aluminum, 2 parts of powdered zinc, 20 parts of chromium oxide and 13 parts of sodium silicate. Sufficient water is added to form a thin slurry. The slurry is brushed or placed on both or one of the electrodes so as to give a dried thickness of about 5 milli-inches following the evaporation of the water.

A typical fuel cell is shown in FIGURE 1. It is to be understood that fuel cell 10 is merely an example of one form of fuel cell and that various other fuel cell configurations may be used in place of the specific one illustrated. The fuel cell 10 illustrated is one which uses a sodium lithium carbonate electrolyte. The cell comprises a housing 1 which contains a pair of channeled spacing members 2 and 3. Each spacing member has one or more channels 6 along one surface thereof and the channeled surfaces of a pair of spacing members are opposed and spaced apart. A pair of foraminous electrodes 4 and 5 within the channels are securely positioned and spaced substantially parallel to each other by the channels 6. An electrolyte-matrix 7 is contained between the electrodes 4 and 5.

In the fuel cell 10, the inner electrodes 5 are the anodes and the outer electrodes 4 are the cathodes. In operation, air and carbon dioxide are passed between the cathodes 4 and housing 1. A hydrogen-containing gas is pasesed between the anodes 5.

As shown in FIGURE 2a, an electrolyte-matrix of the invention is assembled with a thin mica or fiber glass sheet 8 about three milli-inches thick disposed within the electrolyte-matrix material 9 between the anode 5 and cathode 4. (Only one-half of the anode-cathode arrangement illustrated in FIGURE 1 is shown in FIGURE 2a.) The fuel cell is then heated to the required temperature of about 700° C., and the electrolyte-matrix material 9 hardens into a porous film and holds enough electrolyte to react with the mica or fiber glass sheet, thereby forming an excellent seal which prevents gas leakage. The electrolyte reacts with the mica or fiber glass sheet to allow ionic conductivity through the entire electrolyte-matrix. The unreacted portion of the mica or fiber glass furnishes additional support for the electrolyte.

Although the preferred embodiment of the invention uses both the thin sheet of mica or fiber glass and the electrolyte-matrix material as prepared above, a mica or fiber glass sheet 8 can be used with just a sodium lithium carbonate electrolyte 11 to form an electrolyte-matrix between the anode 5 and cathode 4, as shown in FIGURE 2b; or the electrolyte-matrix material 9 can be used by itself without a mica or fiber glass sheet as the electrolyte-matrix between the anode 5 and cathode 4, as shown in FIGURE 2c.

The following examples are illustrative of the results obtained using some of the different combinations of the materials of the invention:

EXAMPLE 3

A fuel cell, operating at about 700° C. with a mica sheet of about 5 milliinches in thickness and with a sodium lithium carbonate electrolyte as the electrolyte-matrix, produced after 100 hours of operation, an average of 10 watts/ft.$^2$ of electrode area at 0.85 volt. The fuel used contained about 28% $H_2$.

EXAMPLE 4

A fuel cell, operating at about 700° C. with an electrolyte-matrix material prepared as previously described according to Example 2 as the electrolyte-matrix, produced after 20 hours of operation an average of 32 watts/ft.$^2$ of electrode area at 0.7 volt. The fuel contained about 33% $H_2$.

EXAMPLE 5

A fuel cell, operating at about 700° C. with an electrolyte-matrix composed of the electrolyte-matrix material prepared as previously described according to Example 2 and a sheet of mica of about 1.5 milliinches in thickness, produced after 20 hours of operation, an average of 18 watts/ft.$^2$ of electrode area at 0.90 volt. The fuel used contained about 20% $H_2$.

Although the preferred and other embodiments of the invention have been described in detail, it is to be understood that various changes, substitutions, and alterations can be made therein without departing from the spirit and scope of the invention.

What is claimed is:
1. A method of making an electrolyte-matrix material for a molten carbonate fuel cell, comprising the steps of:
   (a) mixing powdered sodium lithium carbonate ($NaLiCO_3$), powdered magnesium oxide (MgO), powdered aluminum oxide ($Al_2O_3$), and powdered silicon oxide ($SiO_2$) in the ratio of about 53 parts by weight of sodium lithium carbonate to about 15 parts by weight of aluminum oxide, about 6 parts by weight of magnesium oxide and to about 26 parts by weight of silicon oxide.
   (b) heating said mixture in an air atmosphere for about four hours at about 800° C.,
   (c) grinding said mixture to form a powder, and
   (d) mixing about 41 parts by weight of said mixture with about 24 parts by weight of powdered aluminum, about 2 parts of powdered zinc by weight, about 20 parts by weight of powdered chromium oxide, and about 13 parts by weight of sodium silicate.
2. A method of making an electrolyte-matrix material for a molten carbonate fuel cell, comprising the steps of:
   (a) mixing powdered sodium lithium carbonate ($NaLiCO_3$), powdered magnesium oxide (MgO), powdered aluminum oxide ($Al_2O_3$), and powdered silicon oxide ($SiO_2$) in the ratio of about 60 parts by weight of sodium lithium carbonate to about 12 parts by weight of aluminum oxide, about 5 parts by weight of magnesium oxide and to about 23 parts by weight of silicon oxide,
   (b) heating said mixture in an air atmosphere for about four hours at about 800° C.,

(c) grinding said mixture to form a powder, and
(d) mixing about 41 parts by weight of said mixture with about 24 parts by weight of powdered aluminum, about 2 parts by weight of powdered zinc, about 20 parts by weight of powdered chromium oxide, and about 13 parts by weight of sodium silicate.

3. A method of making an electrolyte-matrix material for a molten carbonate fuel cell, comprising the steps of:
  (a) mixing powdered sodium lithium carbonate ($NaLiCO_3$), powdered magnesium oxide (MgO), powdered aluminum oxide ($Al_2O_3$), and powdered silicon oxide ($SiO_2$) in the ratio of about 53 to 60 parts by weight of sodium lithium carbonate to about 15 to 12 parts by weight of aluminum oxide, about 6 to 5 parts by weight of magnesium oxide and to about 26 to 23 parts by weight of silicon oxide, and
  (b) heating said mixture in an air atmosphere for about four hours at about 800° C.,
  (c) grinding said mixture to form a powder, and
  (d) mixing about 41 parts by weight of said mixture with about 24 parts by weight of powdered aluminum, about 2 parts by weight of powdered zinc, about 20 parts by weight of powdered chromium oxide, and about 13 parts by weight of sodium silicate.

4. A molten carbonate fuel cell comprising:
  (a) an anode and a cathode; and
  (b) an electrolyte-matrix material comprising a mixture of about 53 to 60 parts by weight of powdered sodium lithium carbonate ($NaLiCO_3$), about 6 to 5 parts by weight of powdered magnesium oxide (MgO), about 15 to 12 parts by weight of powdered aluminum oxide ($Al_2O_3$), and about 26 to 23 parts by weight of silicon oxide ($SiO_2$), which has been heated in an air atmosphere for about four hours at about 800° C., said mixture having been ground into a powder, and about 41 parts by weight of said powder mixed with about 24 parts by weight of powdered aluminum, about two parts by weight of powdered zinc, about 20 parts by weight of powdered chromium oxide, and about 13 parts by weight of sodium silicate.

5. A molten carbonate fuel cell as claimed in claim 4, further comprising a fiber glass sheet disposed with said electrolyte-matrix material.

6. A molten carbonate fuel cell as claimed in claim 4, further comprising a mica sheet disposed within said electrolyte-matrix material.

References Cited

UNITED STATES PATENTS

| | | | |
|---|---|---|---|
| 3,276,910 | 10/1966 | Grasselli et al. | 136—86 |
| 3,351,491 | 11/1967 | Harris et al. | 136—86 |
| 3,367,801 | 2/1968 | Kreiselmaier | 136—86 |

ALLEN B. CURTIS, Primary Examiner

U.S. Cl. X.R.

136—153